United States Patent
Hare, Jr. et al.

(10) Patent No.: US 8,761,367 B2
(45) Date of Patent: Jun. 24, 2014

(54) METHOD AND SYSTEM FOR IDENTIFYING AND REMOVING STALE CONNECTIONS ON A USER DEVICE

(75) Inventors: William C. Hare, Jr., Cumming, GA (US); Angela Katharine Lyda, Atlanta, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1221 days.

(21) Appl. No.: 11/961,880

(22) Filed: Dec. 20, 2007

(65) Prior Publication Data

US 2008/0159523 A1    Jul. 3, 2008

Related U.S. Application Data

(60) Provisional application No. 60/877,278, filed on Dec. 27, 2006.

(51) Int. Cl.
*H04M 3/42* (2006.01)
*H04M 3/14* (2006.01)

(52) U.S. Cl.
CPC ................................ *H04M 3/14* (2013.01)
USPC .................... 379/207.06; 379/81; 379/377

(58) Field of Classification Search
CPC ............................................... H04M 3/14
USPC ...................... 379/377–385, 81, 207.06
See application file for complete search history.

(56) References Cited

U.S. PATENT DOCUMENTS

| | | | | |
|---|---|---|---|---|
| 5,940,409 A * | 8/1999 | Bergin | ......................... | 370/523 |
| 6,608,887 B1 * | 8/2003 | Reksten et al. | ............... | 379/67.1 |
| 7,103,067 B1 * | 9/2006 | Singh et al. | .................... | 370/467 |
| 7,701,914 B1 * | 4/2010 | Beser | ............................. | 370/341 |
| 2003/0123643 A1 * | 7/2003 | Burgess | ........................ | 379/352 |
| 2005/0018835 A1 * | 1/2005 | Neveux | ......................... | 379/377 |
| 2005/0195745 A1 * | 9/2005 | Scott et al. | ..................... | 370/241 |
| 2008/0080690 A1 * | 4/2008 | Burns | ....................... | 379/201.01 |

* cited by examiner

*Primary Examiner* — Alexander Jamal
(74) *Attorney, Agent, or Firm* — Troy A. Van Aacken

(57) ABSTRACT

A device containing an MTA, executing a connection deletion method, determines that a connection at one of its endpoints may be abandoned after a predetermined amount of time after an on-hook event following a first call. If the MTA determines that the CMS it is coupled to has begun managing a new, or second, call, the MTA, sends a message to the CMTS it is coupled to requesting deletion of the first call, and the resources associated with it. The MTA also sends a message to the CMS requesting deletion of the connection at the endpoint of the MTA device.

20 Claims, 2 Drawing Sheets

METHOD AND SYSTEM FOR IDENTIFYING AND REMOVING STALE CONNECTIONS ON A USER DEVICE

CROSS REFERENCE TO RELATED APPLICATION

This application claims priority under 35 U.S.C. 119(e) to the benefit of the filing date of Hare, et. al., U.S. provisional patent application No. 60/877,278 entitled "Method and system for identifying and removing stale connections on a packetcable E-MTA," which was filed Dec. 27, 2006, and is incorporated herein by reference.

FIELD OF THE INVENTION

This invention relates, generally, to communication networks and, more particularly preventing continuted allocation of bandwidth for unused connections in a communication network.

BACKGROUND

The PacketCable standard defines mechanisms via the Network-based Call Signaling (NCS) specification for detecting connections to an E-MTA that have become stale. However, the mechanisms are only defined for use by the Call Management Server ("CMS"). Furthermore, these mechanisms do not always operate in practice, either because of system 'glitches' or because a network operator has disabled the feature.

FIG. 1 illustrates a system 2 for providing telephony services, for example, from a plurality of user interface devices 4A-4n. The user device, which may include, for example, E-MTA devices, provide one or more ports to plug a traditional telephone device into. Each port, including its physical and logical aspects, may be referred to as an endpoint. User devices 4 couple to a cable modem termination system ("CMTS") 6 via a hybrid fiber coaxial network ("HFC") 8, as may be implemented by a cable services provider, sometimes referred to as a multiple services provider ("MSO"). CMTS 6 typically couples to CMS 10 via an IP network, for example the internet, over a network 12, such as, for example, an Ethernet protocol network. The dashed lines between CMS 10 and user devices represent a logical connection but not necessarily a physical connection. This logical connection passes messages over HFC 8 and IP network 12 so that CMS 10 and user devices 4 are essentially in communication.

A "stale" connection is defined as a connection that remains to an endpoint of an E-MTA after the user has gone on-hook and no longer serves a useful purpose. Even though a user has 'hung up' a telephony by placing the handset on hook or by, for example, pressing an 'off' button on an electronic (typically cordless) telephone, when the telephony device is coupled to a user device, such as, for example, a media terminal adaptor ("MTA") or E-MTA ("embedded MTA") may still maintain a connection between itself and a CMTS. A management network device, for example a CMS, may receive information that a telephony device coupled to an MTA or E-MTA (for purposes herein, MTA and E-MTA are used interchangeably) is in an on-hook condition and then issue a message to the E-MTA and the CMTS that the connection is deleted. When the E-MTA and the CMTS receive their respective messages that the connection is deleted, the resources, i.e., bandwidth, that were previously allocated for the call are released for use by other applications and/or other user devices.

However, occasionally, the CMS does not properly process the information that the telephony device is on-hook, and thus fails to instruct the CMTS to delete the connection. This may occur due to a 'bug' or 'glitch' in the operating software of the CMTS or E-MTA device. The CMS may also fail to delete the connection if it is programmed to maintain a connection a certain amount of time after an on-hook condition m case a just-terminated call was a 911 call or call to a similar emergency/safety-related endpoint. Although the CMS may be programmed to instruct the CMTS and E-MTA to delete the call and release resources, for a variety of reasons the CMS may not generate and send an instruction to do so. Since the CMS is typically not directly coupled to ac given E-MTA, and the E-MTA is where a user causes an on-hook condition, the CMS lose track of the need to delete the call because it is involved in other network operations, it loses power or is other wise prevented from performing its functions, or, as discussed above, an error in the software occurs.

Therefore, there is a need for a method for detecting and removing at a user device user device, a stale connection to an E-MTA.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full, and enabling disclosure of the invention. The disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
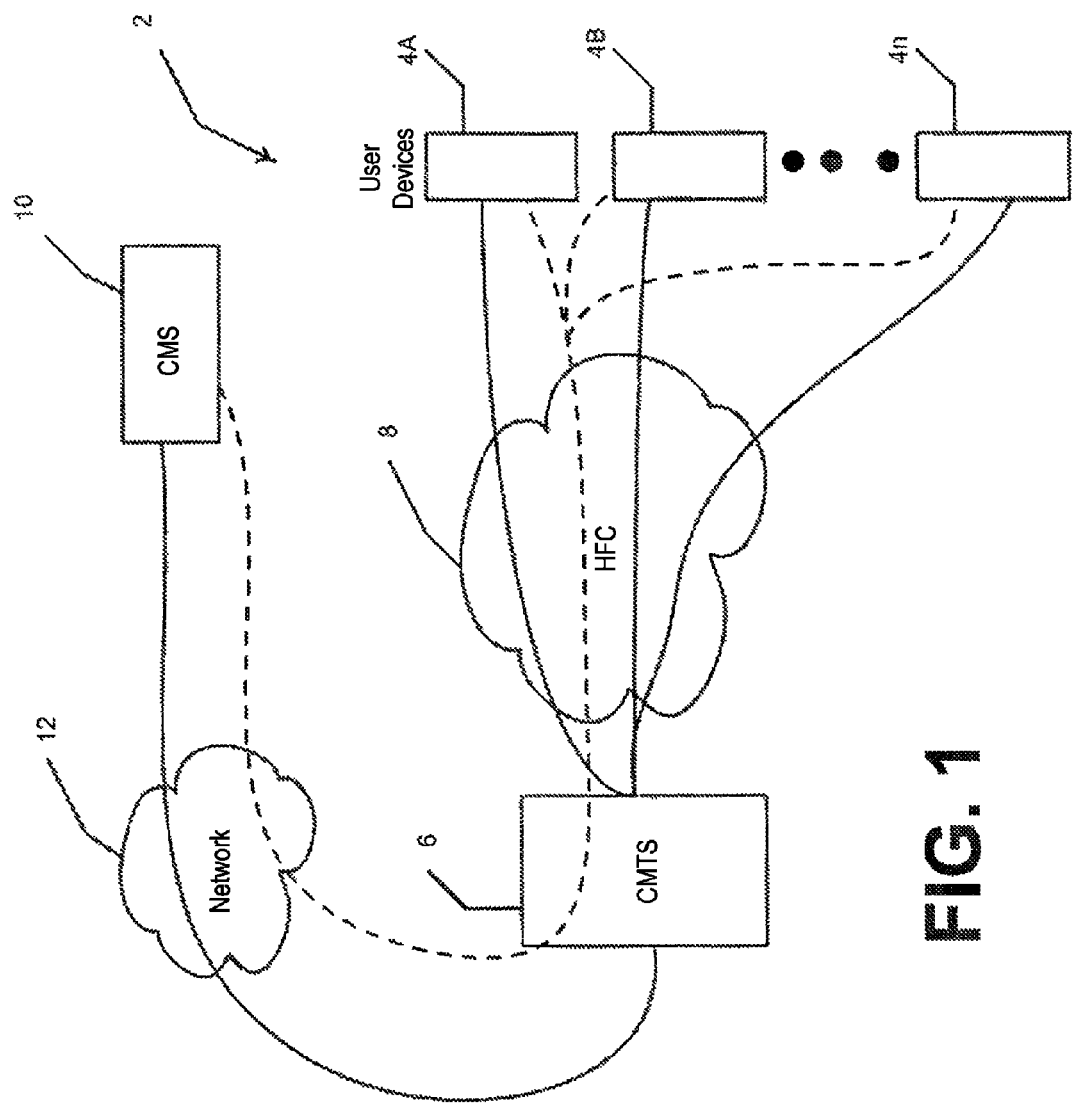
FIG. 1 illustrates a system for providing telephony services over n HFC network.
Figure 2:
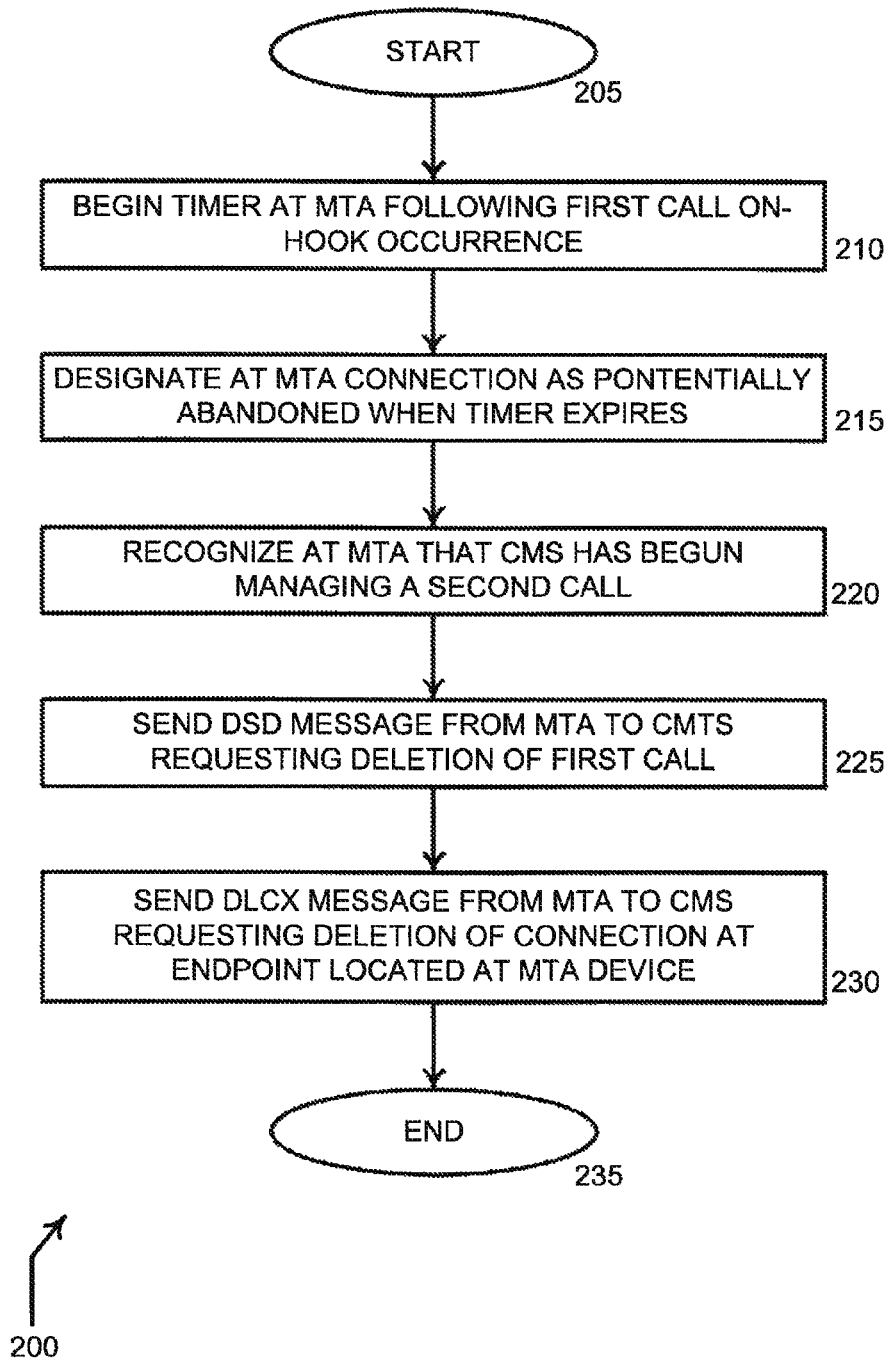
FIG. 2 illustrates a flow diagram of a method for removing stale connections from an endpoint.

Turning now to the figures, FIG. 2 illustrates a flow diagram of a method 200 for removing stale connections from an endpoint. Method 200, preferably controlled by software executed by and at a user device, begins at step 205, typically upon an on-hook event where a user places a telephony hand set back in its cradle, the telephony device being coupled to the user device. The user device typically includes an MTA or an E-MTA device, which is typically an integrated circuit and associated supporting circuitry if any. The E-MTA device senses that the handset of the telephone device coupled to it is on-hook when current does not flow through the endpoint port of the user device.

When the user device senses the on-hook occurrence following a first call, method 200 begins a tinier at step 210. The timer may be controlled by a management information base ("MIB") value. The MIB may be, but does not have to be, the MIB used in PacketCable devices having object name pktc-NcsEndPntConfigThist. Upon the expiration of the timer, i.e., the timer counted down to zero, method 200 causes the E-MTA to designate the connection that existed to support the first call as abandoned at step 215. Designating a connection as potentially abandoned does not necessarily mean that the CMTS has released resources allocated for the connection yet, e.g., bandwidth, but just that the connection may be currently unused.

After the MTA, being operated by method 200, has designated the connection as potentially abandoned, the MTA waits in anticipation of information that the CMS it is logically coupled with has begun managing a second call, or new call with respect to the first call. When the MTA recognizes that the CMS has begun managing a second call at step 220, the MTA sends a message to the CMTS at step 225 requesting that the CMTS remove allocation, of resources, such as bandwidth, for example, from association with the first call connection. The message sent at step 225 may include a dynamic service delete ("DSD") message. At step 230, the MTA sends a message to the CMS requesting that the connection at the endpoint of the user device be deleted. The message sent from the MTA to the CMS at step 230 includes a delete connection message ("DLCX"). Thus, an MTA, under the operational control of method 200, can determine when a call has ended and that the connection that was used for the call can be deleted logically so that resources that had been allocated for the call can be released and used for other traffic.

The following paragraphs provide some details of an aspect.

An MTA does not consider a connection, which refers to the logical and in some cases the physical association of two endpoints, potentially abandoned, or 'stale', at the moment a user at the MTA goes on-hook. In some cases, e.g. E911, the CMS that controls the MTA will purposely leave the connection active for a period of time after the user hangs up. In addition, the CMS typically takes a small amount of time to process the on-hook notification and trigger a subsequent DLCX command from the E-MTA. Network propagation delay also needs to be taken into consideration. PacketCable defines the life of a transaction by the pktcNcsEndPntConfigThist MIB object. The default value for this MIB object is 30 seconds and takes into account typical network propagation delay between the E-MTA and CMS. Since two transactions re typically completed before a connection is deleted— notification of the on-hook event and delete connection command—the MTA at the endpoint in questions should wait about 2×pktcNcsEndPntConfigThist seconds after the user device goes on-hook before deeming a connection as stale.

However, once deemed potentially abandoned, or stale, the connection is not immediately deleted. This prevents deletion of a call when the CMS and E-MTA are merely out of sync with each other, i.e. the CMS determines that the connection does not exist when in fact it does. If at any time after being deemed 'stale', however, the CMS manipulates or even queries the status of the connection, then the 'stale' indication is cleared. For example, the CMS may manipulate a connection via the NCS Modify Connection (MDCX) command. Alternatively, the connection may be queried directly with an Audit Connection (AUCX) command or indirectly with an Audit Endpoint (AUEP) command by including the "Connection-Identifiers" audit request MIB in a message to the CMTS.

Furthermore, some connections are meant to exist on on-hook lines. The REPLCATE connection mode is used on a connection to replicate all traffic into and out of a particular endpoint on an E-MTA, when, for example, a conference call is implemented. These connections may last from call to call.

Some connections may be created to test endpoint functionality and are independent of endpoint hook status. For example, NCS allows the use of both NETWLOOP and NETWTEST connection modes for this purpose. Thus, connections that exist on an endpoint in the REPLCATE, NETWLOOP or NETWTEST connection mode should be exempt from being deemed as stale. As discussed above, when a connection is deemed as being 'stale' the E-MTA may not delete it right away. In the case of E911, the connection may be re-used when the user goes back off-hook. However, if the CMS creates a new connection on the line, then the stale connection is typically deleted.

What is claimed is:

1. A method for deleting stale connections at a user device, comprising:
   detecting at the user device that a first call has terminated due to an extended on-hook event;
   determining at the user device that the first call has been abandoned by a remote call agent though the remote call agent has not deleted the call as having been terminated due to any on-hook event, an abandoned call being distinguished from a terminated call in that the resources for the first call remain allocated by the remote call agent though the first call has been detected as terminated; and
   releasing at the user device resources that are allocated to the call responsive to a determination that the first call has been abandoned.

2. The method of claim 1 wherein the step of detecting includes beginning an abandonment timer upon an on hook event and designating the connection as potentially abandoned when the timer expires, the abandonment timer being substantially longer than a call termination timer.

3. The method of claim 1 wherein the step of determining includes recognizing that a management network device has begun management of a second call at the user device.

4. The method of claim 1 wherein the step of determining includes recognizing that a management network device has not abandoned management of the first call based on a message containing information that the management network device has manipulated the first call.

5. The method of claim 1 wherein the step of releasing includes sending a message from the user device to a centrally located network device to release resources that had been allocated to the first call and sending a message from the user device to the remote call agent to delete the connection associated with the first call.

6. The method of claim 5 wherein the message to release resources is dynamic service delete ("DSD") message.

7. The method of claim 5 wherein the message to delete the connection is a delete connection message ("DLCX").

8. The method of claim 1 wherein the remote call agent is a call management server ("CMS").

9. The method of 5 wherein the centrally located device is a cable modem termination system.

10. A device, comprising:
    a memory device having code stored therein for controlling the device in performing the steps of:
    detecting at the device that a first call has terminated;
    determining at the device whether the first call has been abandoned by a remote call agent; and
    initiating a release of device resources and network resources that are allocated to the first call if a determination is made that the first call has been abandoned by the remote call agent.

11. The device of claim 10 wherein the step of detecting includes beginning a timer upon an on hook event and designating the connection as potentially abandoned when the timer expires.

12. The device of claim 10 wherein the step of determining includes recognizing that a management network device has begun management of a second call at the user device.

13. The device of claim 10 wherein the step of determining includes recognizing that a management network device has not abandoned management of the first can based on a message containing information that the management network device has manipulated the first call.

14. The device of claim 10 wherein the step of deleting includes sending a message from the user device to a centrally located network device to release resources that had been allocated to the first call and sending a message from the user device to the management network device to delete the connection associated with the first call.

15. The device of claim 14 wherein the message to release resources is dynamic service delete ("DSD") message.

16. The device of claim 14 wherein the message to delete the connection is a delete connection message ("DLCX").

17. The device of claim 13 wherein the management network device is the remote call agent.

18. The device of claim 17 wherein the call agent is a call management server ("CMS").

19. The device of claim 14 wherein the centrally located device is a cable modem termination system.

20. The device of claim 10 wherein the memory device includes a random access memory.

* * * * *